United States Patent [19]

Godbersen

[11] Patent Number: 5,024,312
[45] Date of Patent: Jun. 18, 1991

[54] BOAT SUPPORT ROLLER ASSEMBLY

[76] Inventor: Byron L. Godbersen, Lake LaJune Estates, Ida Grove, Iowa 51445

[21] Appl. No.: 507,985

[22] Filed: Apr. 12, 1990

[51] Int. Cl.$^5$ .............................................. B60P 3/10
[52] U.S. Cl. ................................. 193/37; 280/414.1; 414/534
[58] Field of Search ............... 384/202, 220; 193/37, 193/35 R, 35 F, 35 C; 414/529, 534, 533; 280/414.1

[56] References Cited

U.S. PATENT DOCUMENTS

| | | |
|---|---|---|
| 2,703,165 | 3/1955 | Couser . |
| 3,155,249 | 11/1964 | Johnson . |
| 3,400,988 | 10/1968 | Hudson et al. . |
| 3,608,236 | 9/1971 | Beny et al. . |
| 3,756,439 | 9/1973 | Johnson . |
| 3,892,320 | 7/1975 | Moore . |
| 3,917,087 | 11/1975 | Godbersen . |
| 3,942,403 | 3/1976 | Pramberger ................... 384/202 X |
| 4,196,502 | 4/1980 | Johnson ........................ 414/529 X |
| 4,210,235 | 7/1980 | Johnson . |
| 4,761,083 | 8/1988 | Smith et al. .................... 384/220 X |
| 4,820,111 | 4/1989 | Godbersen . |
| 4,900,216 | 2/1990 | Godbersen ........................ 414/534 |

Primary Examiner—D. Glenn Dayoan
Attorney, Agent, or Firm—Henderson & Sturm

[57] ABSTRACT

A roller assembly for supporting a boat on a trailer which has a hub with a resilient surface, and wherein the hub rotates on a cat's eye-shaped bushing which allows limited swivel and acts as a positive guide to the boat hull for providing straight line loading.

10 Claims, 3 Drawing Sheets

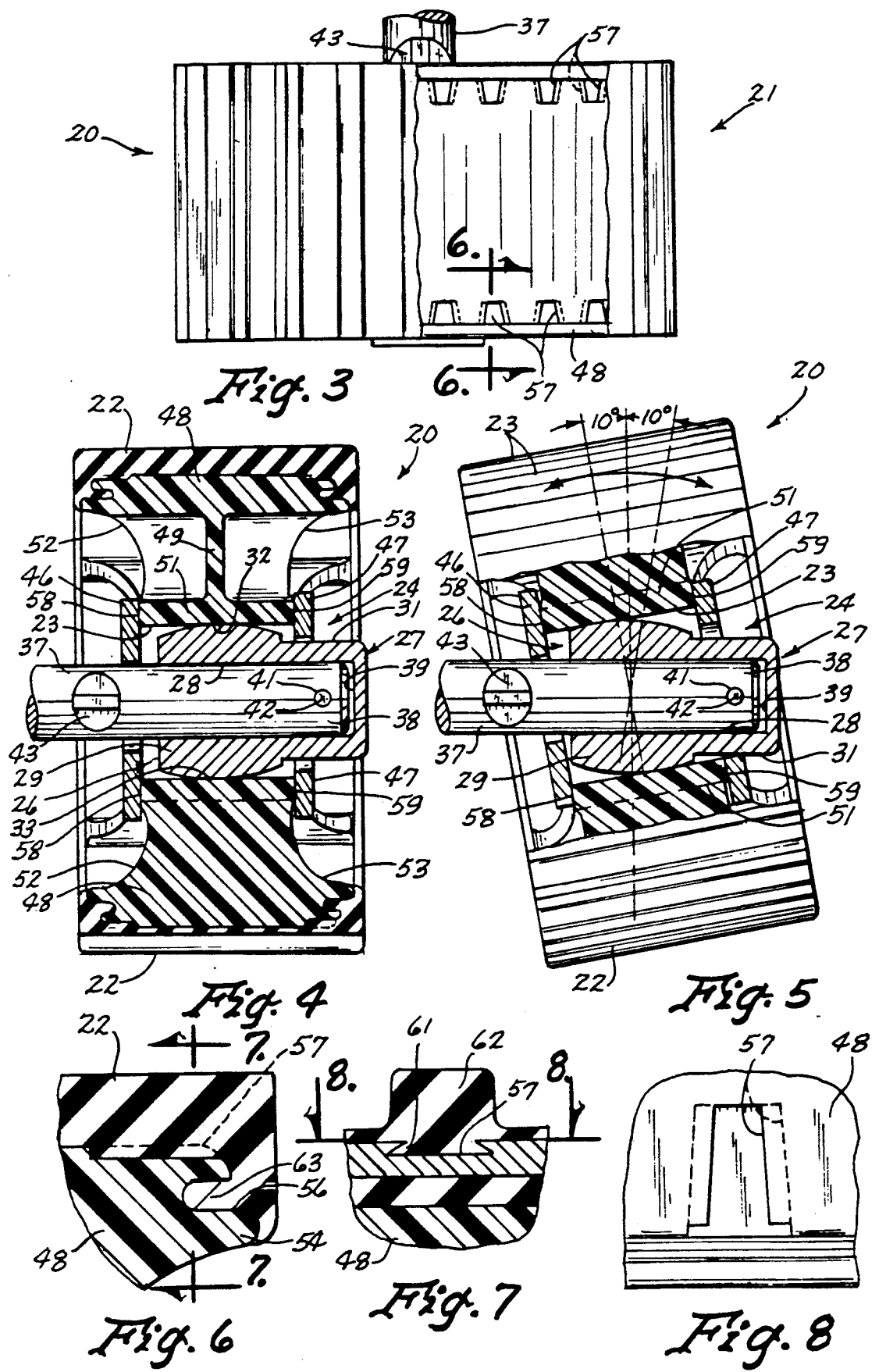

BOAT SUPPORT ROLLER ASSEMBLY

TECHNICAL FIELD

The present invention relates to boat trailers in general, and in particular to a roller assembly for, in combination with other like roller assemblies, supporting a boat on a trailer.

BACKGROUND ART

With an ever increasing number of different sized, shaped and weighted boats due to the increasing popularity of this industry, it is recognized that the trailer must securely support the boat carried thereby, and that the boat hull supporting elements quickly conform to the contour of the hull for proper distribution of the weight of the boat and to avoid localized stresses.

Adequate weight distribution for the massive hulls supported by these modern tandem-type boat trailers provides relative ease of maneuverability during loading and launching, and steady towing characteristics.

One manner of support is in the form of rollers, usually of a hard rubber, either in individual units of an in-line nature, or in gangs wherein the rollers form, for example, a box of four or more which are equidistantly spaced and in longitudinal and axial alignment. Certain of these rollers are mounted for rotation about a normally horizontal axis alone, depending on a pivoting action of the roller mounting in a vertical plane, while other rollers are provided with a swiveling or wobbling movement on their own shaft, all to adapt the rollers to the contour of the surface of the boat hull in the most expeditious manner for equally distributing the weight of the hull over the greatest area while providing a positive guide to the hull for loading purposes.

DISCLOSURE OF THE INVENTION

This invention comprises a roller assembly to be used with other roller assemblies of like structure for supporting a boat on a trailer or the like, which hub has either a hard rubber-like surface or a cushion-type surface, and wherein the inner hard rubber-like bearing surface rotates on a cat's eye shaped busing which allows a limited swiveling action of the roller about a vertical axis such that the roller provides a positive guide to the boat hull for straight line loading.

It is an object of this invention to provide an improved roller assembly for supporting a boat hull.

It is another object of this invention to provide a roller assembly which, when combined with other like roller assemblies as a part of a boat trailer will provide equal weight distribution for boat hulls of all sizes and configuration.

Another object of this invention is to provide a roller assembly capable of providing a swiveling action on its own shaft whereby to conform to and positively guide for loading movement a great variety of boat hulls.

Yet another object of this invention is to provide such a roller assembly with either a solid, hard-rubber type surface or an improved cushion-type surface with some deflection for load bearing and hull configuration purposes.

BRIEF DESCRIPTION OF THE DRAWINGS

These and other attributes of the invention will become more clear when a thorough study of the following description of a preferred embodiment of the invention, particularly when reviewed in conjunction with the accompanying drawings wherein:

FIG. 3 is a plan view of the roller assembly of FIG. 2, again with certain parts broken away for clarity of the invention;

FIG. 4 is a sectional view taken along the lines 4—4 in FIG. 2;

FIG. 5 is a view similar to FIG. 4 and showing the swiveling or gimbal effect achieved by the present structural arrangement;

FIG. 6 is an enlarged, fragmentary sectional view as taken along the line 6—6 in FIG. 3;

FIG. 7 is an enlarged, fragmentary sectional view as taken along the line 7—7 in FIG. 6;

FIG. 8 is a fragmentary plan view as taken along the line 8—8 in FIG. 7;

BEST MODE FOR CARRYING OUT THE INVENTION

Figure 1:
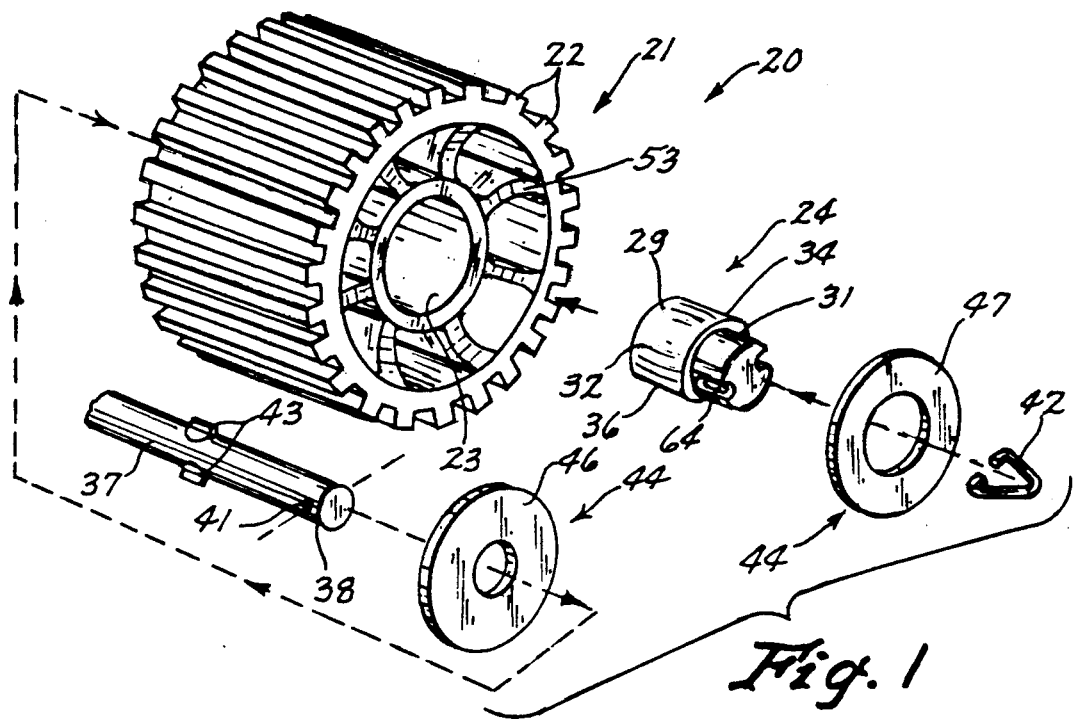
FIG. 1 is a perspective view in exploded form of the roller assembly of the present invention.
Figure 2:
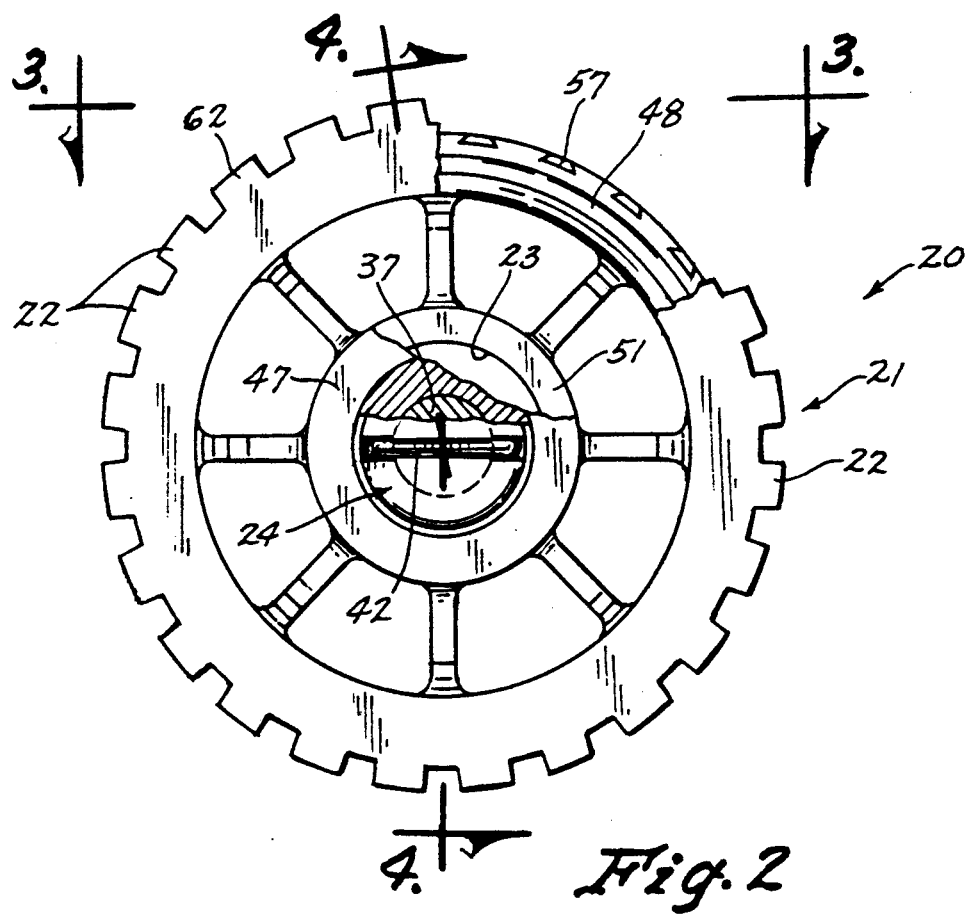
FIG. 2 is an enlarged elevational view from one end of the roller assembly, with certain parts broken away for purposes of clarity.

Although not shown herein, the roller assembly indicated generally at (20) in FIG. 1 is incorporated within a conventional boat trailer framework comprising, for example, an A-type frame mounted at the rear on a wheel and axle unit and having a stand-supported tongue at the front for connection to a prime mover. One or more cross braces are usually provided for structurally strengthening the frame and for supporting units in the form of bunks or rollers in various groupings for supporting in turn a boat having a hull of infinitely varying sizes and configurations, and for guiding the hull during loading and unloading. An example of the type of boat trailer to which the present roller assembly is applicable is shown in U.S. Pat. No. 4,820,111 issued Apr. 11, 1989 to the inventor.

Figure 9:
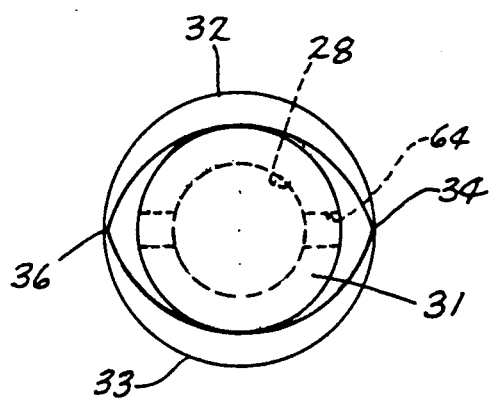
FIG. 9 is a side elevational view of the bushing as viewed from the left side of FIG. 4.

The present roller assembly (20) comprises an annular hub (21) having a resilient, circumferential surface (22) for supportively engaging the hull of a boat when moved into contact therewith, the hub (21) having a bore (23) formed axially therein; a bushing (24) (FIGS. 1 and 4) comprising an annular member open at one end (26) and closed at the other end (27) with a bore (28) formed axially therein, the open end portion (29) of the bushing (24) having an outside diameter larger than that of the closed end portion (31), and having opposed convexly shaped surfaces (32), (33) (FIGS. 1 and 9) extended axially thereof, whereby to provide for swiveling or gimbal-like movement of the hub (21) relative to the bushing (24) upon engagement of the hub unit bore (23) with the bushing surfaces (32), (33) as best seen in FIG. 5. The bushing (24) has a cat's eye shape when viewed from either end thereof (FIG. 9) due to surfaces (32), (33) varying in radius from end-to-end or axially to thus form the convex shape in side elevation (FIG. 4), but not varying and having a constant radius at the surfaces (34), (36) (FIG. 9). The surfaces (34), (36) are straight from end-to-end of the portion (29).

The roller assembly (20) comprises further a straight shaft (37) of a diameter for a snug insertion into the bore (28) of the bushing (24), with the inner shaft end (38) placed closely adjacent the inner end (39) of the bore (28). A small hole (41) is formed through the inner shaft end (38) for receiving a pin (42) for fastening the bushing (24) onto the shaft (37) as described in detail hereinafter, and swedges (43) are formed radially about the shaft (37) at a location thereon spaced axially of the end (39) a distance to clear other parts of the roller assembly (20) as seen hereinafter (FIG. 4). A swivel limiting unit (44) comprising a pair of washers (46), (47) is located with a washer (46), (47) placed on either side of the hub unit (21) whereby to limit the degree of swiveling of the hub unit (21) relative to the bushing (24). As noted in FIGS. 4 and 5, the location of the swedges (43) and the pin (42) limit axial movement of the washers (46), (47) relative to the shaft (37).

More particularly, the hub (21) is comprised of a polypropylene, ten percent (10%) glass filled material with an outer rim (48) (FIG. 4) joined by a stem (49) in cross section with an inner rim (51) of a width less than the width of the outer rim (48), concavely curved surfaces (52), (53) extended between the rims (48), (51). Each outer edge (54) of the outer rim (48) has an inwardly extended annular groove (56) (FIGS. 4 and 6) formed therein, and with a slot (57) formed in the upper, outer surface, the slot (57) having a Z-shape in elevation (FIG. 7), and a T-shape in plan view (FIG. 8). A plurality of slots (57) are formed annularly about each edge (54) in equidistantly formed relation. It will be noted the flat shoulders (58), (59) on each end of the inner rim (51) are aligned whereby the flat contiguous face of a washer (46), (47) is free to move in the plane of the shoulders (58), (59), in this case normally in a substantially vertical plane.

The outer surface (22) comprises a tire of thermoplastic rubber, the outer surface of which comprises a geartooth formation, and with a Z-type protrusion (61) (FIG. 7) formed below each tooth (62) for filling the Z-shape slot (57). Additionally, an inwardly extended protrusion (63) (FIG. 6) extends into the outer rim annular groove (56), whereby the outer surface tire (22) is securely bonded to the hub outer rim (48).

The bushing (24) is further provided with a pair of diammetrically opposed openings (64) (FIG. 1) formed in the closed end portion (31), which openings (61) are alignable with the shaft hole (41) for receiving the V-shaped fastener (42).

Referring to FIGS. 4 and 5, it will be seen that the washer (46) has an inner diameter slightly greater than the outer diameter of the shaft (37) whereby the washer is tiltable about a vertical plane approximately 10°, and the washer (47) also has an inner diameter slightly greater than the outer diameter of the bushing portion (31) such that it also has an approximate 10° tilt. As the washers (46), (47) are also limited in their axial movement by the swedges (43) and pin (42), they maintain the bushing (24) and hub (21) centered relative to each other for achieving an improved swiveling or gimballing action of the roller assembly to achieve its objectives.

Figure 10:
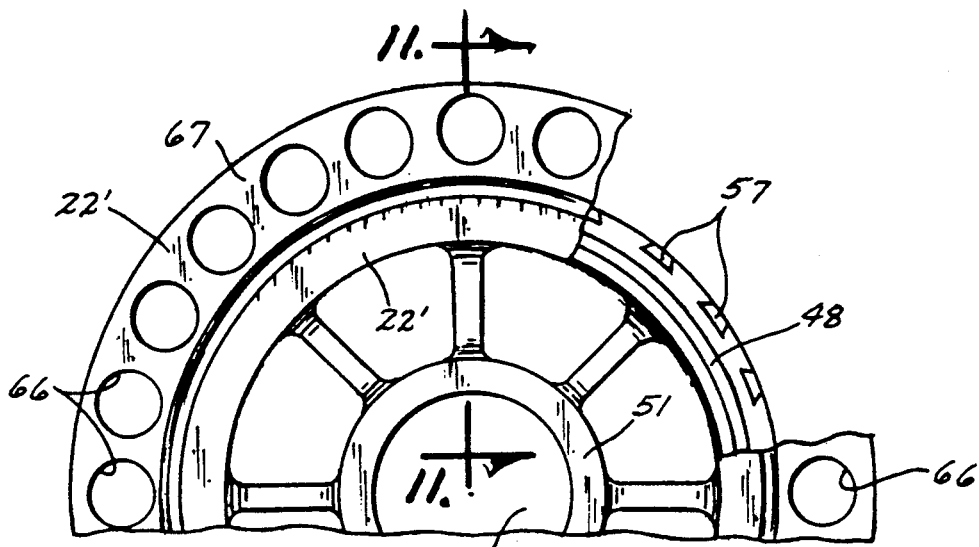
FIG. 10 is a slightly enlarged view similar to FIG. 2, and showing a modification of the tire structure thereof.
Figure 11:
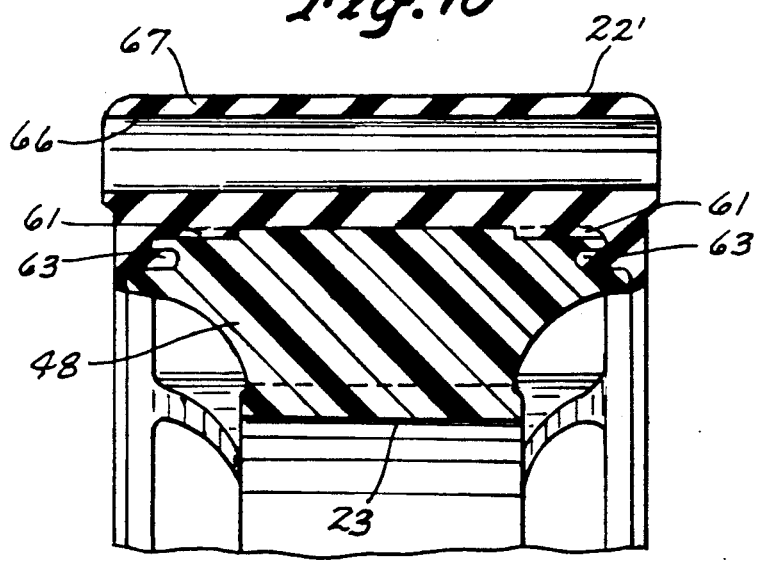
FIG. 11 is a sectional view taken along the line 11—11 in FIG. 10.

A modified construction of the outer surface tire (22') is shown in FIGS. 10 and 11, the tire (22') being constructed particularly for boats with aluminum hulls although usable with all type boats. A plurality of transversely extended, tubular openings (66) are formed in the outer tire portion (67), rather than the gear tooth formation of FIGS. 1-9, with the openings (66) in an arcuate contiguous formation, whereby the outer tire portion (67) is softer and has more deflection than the hub outer rim (48) or the gear tooth formation for load bearing purposes.

In use, the shaft (37) could be, for example, the free end or leg of a U-shaped mounting rod affixed to a cross member portion of a boat frame, whereby to place the roller assembly (20) in a position for engagement with a boat hull upon loading of same upon the boat trailer in which the roller assembly (20) is incorporated. An example of this arrangement is shown specifically in FIGS. 13-17 of U.S. Pat. No. 4,820,111 mentioned hereinbefore.

I claim:

1. A roller assembly for supporting a boat on a trailer comprising:

annular hub means having a resilient circumferential surface for supportively engaging the hull of a boat when moved into contact therewith, said hub means having a bore formed axially therein;

bushing forming means comprising an annular member having an open portion at one end and a closed portion at the other with a bore formed axially therein, the open end portion of said member having a diameter larger than the closed end portion and having opposed convexly shaped surfaces extended axially thereof whereby to provide for swiveling movement of said hub means relative to said bushing forming means upon engagement between said convexly shaped surfaces with surfaces of said hub means bore;

a shaft inserted into said bushing means bore for placing said bushing means into contacting supportive engagement with said hub means bore surfaces;

swivel limiting means placed on either side of said annular member open end portion relative to said shaft and to said annular member closed end portion whereby to limit the degree of swiveling of said hub means; and means connected to said shaft on either side of said swivel limiting means to locate and maintain said annular member open end portion within the axial extent of said hub means bore.

2. A roller assembly as in claim 1, wherein said annular hub means further includes a tire member bonded to an outer rim portion thereof, which tire member has slots and ribs forming a gear teeth-type surface for positive engagement with a boat hull.

3. A roller assembly as in claim 1, wherein said annular hub means further includes a tire member bonded to an outer rim portion thereof, which tire member has bore-like openings formed in equidistance spaced relation about said outer rim portion, said openings disposed axially of said hub means, whereby a certain amount of deflection is provided for a load-bearing boat hull.

4. A roller assembly as in claim 3, wherein said hub means outer rim portion has Z-shaped openings formed therein along the outer edges thereof in equidistantly spaced relation for receiving portions of said tire, member bonded within said openings of said outer rim portion.

5. A roller assembly as in claim 1, wherein said convexly shaped surfaces of said open end portion of said bushing forming means form opposed convex surfaces extended axially of said hub means when engaged with said hub means bore surfaces.

6. A roller assembly as in claim 5, and further wherein the surfaces of said open end portion in a plane perpendicular to said convex surfaces extend axially straight, having equal diameters throughout their axial length, whereby said annular member has a cat's eye appearance in end elevation.

7. A roller assembly as in claim 1, and further wherein an end of said shaft inserted into said bushing means bore is seated substantially at the closed end thereof.

8. A roller assembly as in claim 1, wherein said swivel limiting means further comprising a pair of flat washers, one of said washers movably mounted on said shaft on one side of and engageable with said hub means, the other of said washers movably mounted on said bushing forming means closed end portion on an opposite side of and engaged with said hub means.

9. A roller assembly as in claim 4, and further wherein said convexly shaped surfaces of said open end portion of said bushing forming means form opposed convex surfaces extended axially of said hub means when engaged with said hub means bore surfaces, an end of said shaft inserted into said bushing means bore is seated substantially at the closed end thereof, and wherein said swivel limiting means further comprising a pair of flat washers, one of said washers movably mounted on said shaft on one side of and engageable with said hub means, the other of said washers movably mounted on said bushing forming means closed end portion on an opposite side of and engaged with said hub means.

10. A roller assembly as in claim 9, and further, wherein the surfaces of said open end portion in a plane perpendicular to said convex surfaces extend axially straight, having equal diameters throughout their axial length, whereby said annular member has a cat's eye appearance in end elevation.

* * * * *